United States Patent [19]

Conley et al.

[11] Patent Number: 4,488,741
[45] Date of Patent: Dec. 18, 1984

[54] COMPRESSION COUPLING FOR SERVICE VALVE

[75] Inventors: Richard W. Conley; Richard P. Tremblay, both of Pittsburgh, Pa.

[73] Assignee: Kerotest Manufacturing Corp., Pittsburgh, Pa.

[21] Appl. No.: 462,469

[22] Filed: Jan. 31, 1983

[51] Int. Cl.³ ............................................. F16L 33/18
[52] U.S. Cl. .................................... 285/250; 285/348; 285/356; 285/382.7
[58] Field of Search .............. 285/250, 249, 356, 343, 285/382.7, 348

[56] References Cited

U.S. PATENT DOCUMENTS

| | | |
|---|---|---|
| 1,334,682 | 3/1920 | Snell . |
| 2,452,277 | 10/1948 | Woodling . |
| 2,479,447 | 8/1949 | Wiltse ........................ 285/382.7 X |
| 2,644,700 | 7/1953 | Woodling . |
| 2,779,610 | 1/1957 | Risley ............................ 285/343 X |
| 2,912,262 | 11/1959 | Franck ....................... 285/382.7 X |
| 3,193,299 | 7/1965 | Gardner, Sr. et al. . |
| 3,248,135 | 4/1966 | Meripol . |
| 3,420,261 | 1/1969 | Hawle . |
| 3,563,575 | 2/1971 | Sanford . |
| 3,692,336 | 9/1972 | Zon . |
| 3,865,410 | 2/1975 | Chen . |
| 3,917,324 | 11/1975 | Wakatsuki et al. . |
| 4,008,911 | 2/1977 | Kijooka et al. . |
| 4,062,572 | 12/1977 | Davis ............................ 285/250 X |
| 4,107,452 | 8/1978 | Razvi ............................ 285/250 X |
| 4,256,335 | 3/1981 | Nielsen, Jr. ..................... 285/250 |
| 4,335,908 | 6/1982 | Burge ............................ 285/250 |

FOREIGN PATENT DOCUMENTS

| | | | |
|---|---|---|---|
| 1,093,607 | 1/1981 | Canada ........................ 285/250 |
| 1,027,971 | 5/1966 | United Kingdom ............ 285/356 |
| 2,060,803 | 5/1981 | United Kingdom ............ 285/343 |

Primary Examiner—Thomas F. Callaghan
Attorney, Agent, or Firm—Stanley J. Price, Jr.; John M. Adams

[57] ABSTRACT

A valve includes a molded plastic body portion having an internal chamber forming a valve seat having inlet and outlet openings. A plastic plug member is rotatably positioned in the valve seat and has a flow passage which in the open position of the valve communicates with the inlet and outlet openings. Pipe fittings of the valve body communicate with the valve seat and are aligned with the inlet and outlet openings. Each fitting is coupled to a conduit of a piping system by a nut threaded into the respective fitting to urge a wedge-shaped collar into frictional engagement with the conduit. The nut surrounds the collar which is advanced by the nut into the fitting until a radial shoulder on the nut abuts the end of the fitting so that the end of the nut in the fitting applies a controlled compressive force upon a gasket seal to effect a fluid tight connection of the conduit to the fitting.

4 Claims, 5 Drawing Figures

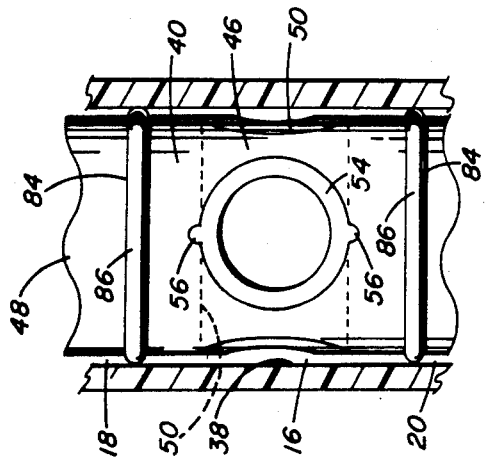
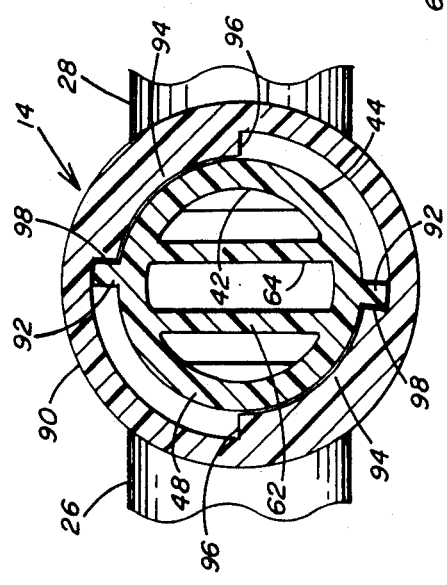
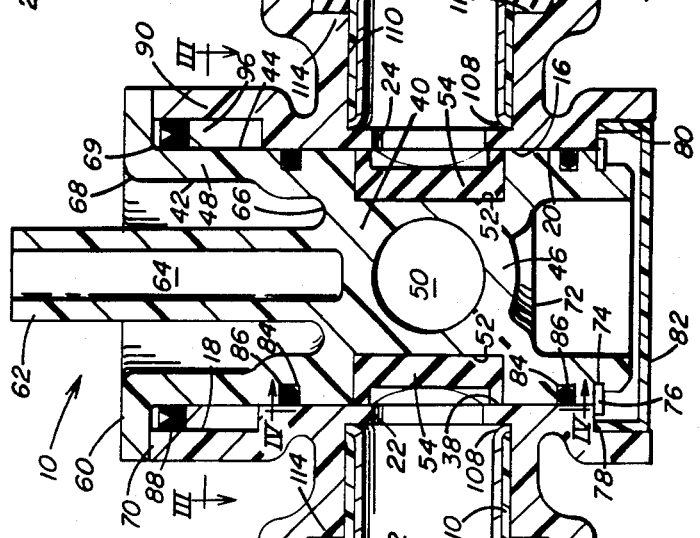
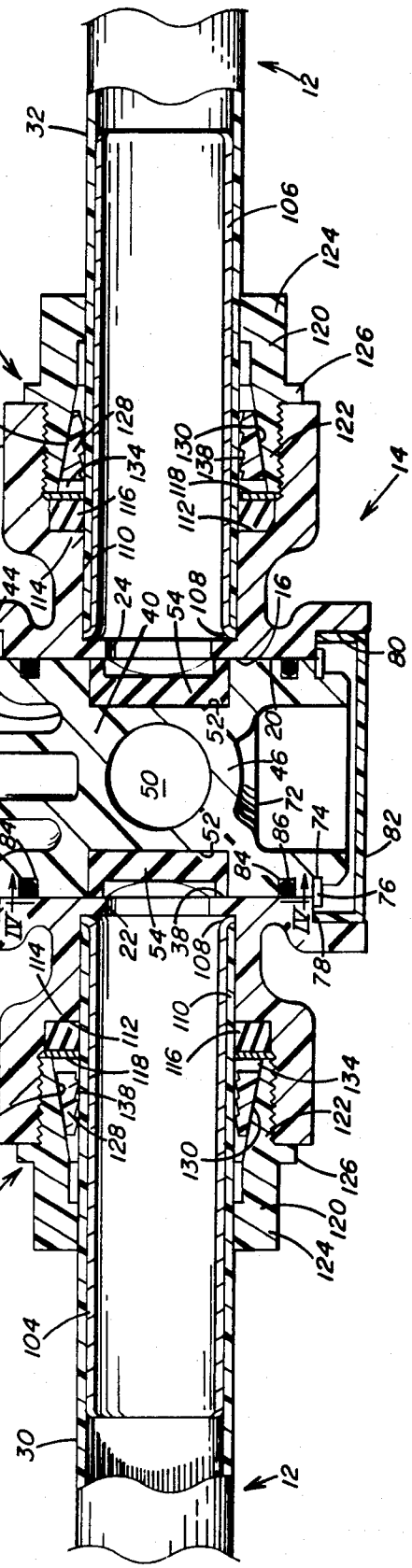

COMPRESSION COUPLING FOR SERVICE VALVE

BACKGROUND OF THE INVENTION

1. Field of the Invention

This invention relates to a compression coupling for a service valve and more particularly to a coupling nut threadedly advanced into a fitting of a valve to wedge a gripping collar into frictional engagement with a conduit received in the fitting and apply a controlled compressive force upon a gasket seal around the conduit to effect a fluid tight connection of the conduit to the fitting.

2. Description of the Prior Art

It is the customary practice with the known plastic service valves to provide a valve body having flow passages that communicate with a valve seat and pipe stub ends that are connectable to a piping system. In one known arrangement, the pipe stub ends are butt or socket fusion joined to the pipes of the system which are fabricated of the same material as the valve. Another arrangement utilizes internally or externally threaded valve ends for connecting the threaded valve ends to matching piping by compression couplings.

Examples of known compression couplings that are adaptable for connecting valve pipe stub ends to transmission pipes are illustrated in U.S. Pat. Nos. 3,563,575; 3,865,410 and 4,008,911. For example, as disclosed in U.S. Pat. No. 3,563,575, a service line pipe is connected to a coupling body by the wedging action of a collar against an internal wedge surface of a nut threaded on the coupling body. The collar has an external wedge surface which is complementary to and cooperates with the internal wedge surface of the nut that surrounds the threaded end of the coupling and is threadedly connected to the coupling. An elastic deformable member, such as an O-ring or a gasket, encircles the pipe and is seated within a recess of the coupling. A thrust washer encircles the pipe between the adjacent ends of the nut and the coupling. As the nut is threaded onto the threaded end of the coupling, the internal wedge surface of the nut coacts with the external wedge surface of the collar to advance the collar into compressive relation with the washer against the end of the coupling and the O-ring.

One disadvantage of this type of compression coupling is premature seizing of the collar on the pipe before the nut is completely threaded on the coupling. This is encountered as a result of the wedging action of the nut on the collar where the nut and collar are wedged into gripping engagement and further axial advancement of the collar on the pipe is prevented.

Another recognized disadvantage of the known compression couplings is subjecting the sealing gasket to an excessive force applied by the collar due to over-torquing or uncontrolled rotation of the nut on the valve pipe stub end. If rotation of the nut is not controlled, the gasket may be compressed beyond its ability to maintain an effective seal around the pipe due to the excessive compression of the gasket by the collar as it is advanced upon rotation of the nut. Therefore, there is need in connecting a plastic service valve to service lines for a compression-type coupling that overcomes the above-recognized problems of both incomplete sealing of the gasket on the pipe and uncontrolled rotation of the nut on the valve pipe stub end to the point where the gasket is compressed beyond its ability to provide an effective seal.

SUMMARY OF THE INVENTION

In accordance with the present invention, there is provided a pipe coupling that includes a fitting having a body portion with a bore for receiving a pipe. The body portion has a recess surrounding the bore to form an internal shoulder within the fitting. An elastic deformable member is positioned in the recess in abutting relation with the shoulder and is adapted to encircle and seal against the pipe and the fitting body portion. A nut is threadedly connected to the fitting body portion for advancement into the bore. The nut has an internal bore with an internal wedge surface. A pipe-gripping collar has an external wedge surface complementary to and cooperating with the nut internal wedge surface so that the collar is positioned within the nut internal bore and surrounding the pipe. The nut includes an end portion surrounding the collar. The nut end portion has a bearing surface for applying a compressive force which is transmitted to the elastic deformable member to compress the elastic deformable member against the fitting shoulder. The nut is threadedly advanced upon rotation into the fitting bore to apply an axial force upon the elastic deformable member to compress the elastic deformable member to form a seal around the pipe and against the fitting body portion within the fitting and axially advance the collar into frictional engagement with the pipe to retain the pipe within the fitting.

A valve body includes inlet and outlet openings surrounding a valve chamber. The fitting extends from each inlet and outlet opening. The fittings extend axially outwardly from opposite sides of the valve body and are adapted to receive the pipe ends of a service or transmission pipeline. Each of the valve fittings is internally threaded to receive an externally threaded end portion of the nut. Each nut is provided with a radially extending shoulder that separates one end portion of the nut from the externally threaded end portion of the nut. The nut is axially advanced upon rotation of the nut into the respective fitting until the shoulder of the nut abuts the end of the fitting. This prevents further advancement of the nut in the fitting. At this stop point the nut internal wedge surface coacts with the collar external wedge surface to lock the collar in frictional engagement with the pipe end in the fitting.

As the nut is rotated into the fitting, the nut applies a compressive force on the elastic deformable member. Preferably, a washer is positioned between the elastic deformable member in the form of a gasket and the end of the nut so that the compressive forces are transmitted from the end of the nut through the washer to the gasket which bears against the shoulder within the fitting bore. The provision of the shoulder on the nut to abut the end of the fitting limits the extension of the nut into the fitting. Consequently, the degree of compression of the gasket by the end of the nut is controlled. This arrangement prevents compression of the gasket beyond its elastic limit and does not require the collar to compress the seal in order to obtain the desired seal, thereby limiting the collar to the function of gripping the pipe end to connect the pipe to the fitting.

Accordingly, the principal object of the present invention is to provide a pipe coupling that includes coacting members that securely grip a pipe to connect it to a fitting, as well as, provide complete and controlled compression of a sealing gasket around the pipe and against the body of the fitting.

An additional object of the present invention is to provide in the connection of a service valve to a pipeline, a compression coupling having a nut threadedly engageable with a fitting of the valve in which advancement of the nut on the fitting is controlled to assure the desired compression of a gasket by the nut around the pipeline and against the body of the fitting while securely locking the pipeline to the service valve.

These and other objects of the present invention will be more completely disclosed and described in the following specification, the accompanying drawings, and the appended claims.

BRIEF DESCRIPTION OF THE DRAWINGS

FIG. 1 is a sectional view in side elevation of a plastic service valve, illustrating the connection of a valve body to a pair of pipes in a pipeline system.

FIG. 3 is a sectional view taken along line III—III of FIG. 1, illustrating the stops on the actuator and valve body for 90° operation of the valve between the open and closed positions.

FIG. 4 is a sectional view taken along line IV—IV of FIG. 1, illustrating one of the two seat seals that are secured to a plug portion of a valve member.

DESCRIPTION OF THE PREFERRED EMBODIMENTS

Figure 5:
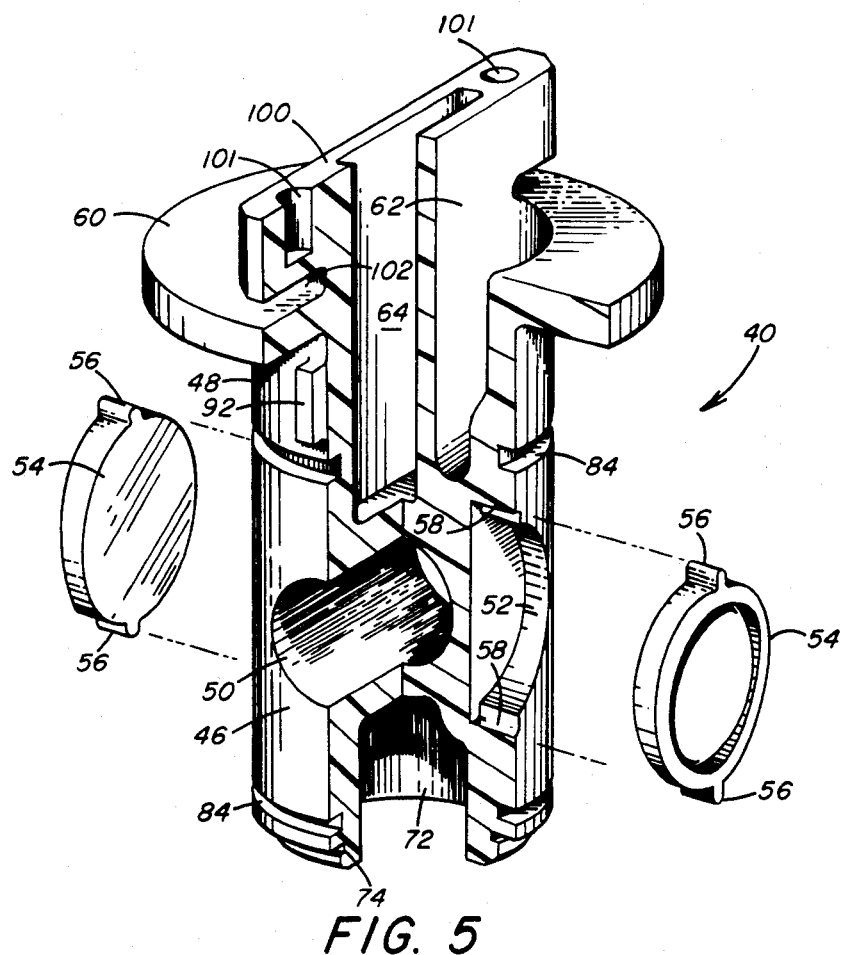
FIG. 5 is an enlarged, exploded, fragmentary, isometric view partially in section of the valve member illustrating an integral plug portion, actuator portion and stem portion and the seat seals that are received within the counterbores of the plug portion.

Referring to the drawings, and particularly to FIG. 1, there is illustrated a service valve generally designated by the numeral 10 of the rotary plug type which is adapted for use as a distribution valve or service stop for controlling the flow of a fluid, either liquid or gas, through a piping system generally designated by the numeral 12. The service valve 10 includes a valve body generally designated by the numeral 14 having a chamber 16 with an upper portion 18 and a lower portion 20. The lower portion 20 has inlet/outlet openings 22 and 24. The valve body 14 also includes conduit or fitting portions 26 and 28 extending from the openings 22 and 24 respectively. The fitting portions 26 and 28 are adapted for connection to a pair of service conduits or pipes 30 and 32 respectively of the piping system 12. The service conduits 30 and 32 are connected to the fitting portions 26 and 28 by compression couplings generally designated by the numeral 34 and 36, which will be described later in greater detail.

The chamber lower portion 20 of the valve body 14 includes a valve seat 38 extending between and around the inlet and outlet openings 22 and 24. A valve member 40 is rotatably positioned in the valve seat 38 between the openings 22 and 24. The valve member 40 is molded of plastic material to form a unitary body of a substantially uniform thickness throughout having an internal surface 42 and an external surface 44. With this configuration, the valve member 40 is efficiently molded, preferably by an injection-molding process, without requiring enlarged body parts having a thickness greater than the other body parts and thereby increasing the complexity of the molding process and costs of machining the mold for the valve member 40.

The valve member 40 includes an integral plug portion 46 and an actuator portion 48. As stated above, the valve member 40 is molded so that both the plug portion 46 and the actuator portion 48 have substantially the same body thickness to provide uniformity of construction throughout the valve member 40. The plug portion 46 has a flow passage 50 therethrough, and is rotatable in the valve seat 38 between an open position and a closed position. In the open position, the flow passage 50 is aligned with the openings 22 and 24 to permit fluid flow therethrough. In the closed position, as shown in FIG. 1, the flow passage 50 is 90° out of alignment with the inlet and outlet openings 22 and 24 to interrupt fluid flow therethrough.

The plug portion 46 is illustrated in greater detail in FIG. 5 and includes a pair of counterbores 52 in the external surface of the plug portion 46. The counterbores 52 are spaced 90° relative to the flow passage 50. Elastomeric inserts 54 are secured in the counterbores 52, as shown in FIGS. 1 and 4, to serve as seat seals for engaging the valve seat 38 around the inlet and outlet openings 22 and 24 when the valve member 40 is in the closed position, as illustrated in FIG. 1. Preferably, the inserts 54 are molded of an elastomeric material, such as Buna N or polyurethane material.

To properly orient and secure the seat seal inserts 54 on the surface of the plug portion 46, the inserts 54 are provided with a pair of oppositely extending keys or tabs 56 shown in FIG. 5 that are received within corresponding keyways 58 of the counterbores 52. The keys 56 have a length substantially corresponding to the keyways 58 so that when the inserts 54 are positioned in the counterbores 52, they are securely and properly oriented on the surface of the plug portion 46 at the location of the counterbores 52. The inserts 54 are slightly oversized in relation to the diameters of the plug counterbores 52. Thus, in order to position the inserts 54 in the counterbores 52, the inserts 54 must be radially compressed. When the inserts 54 are positioned in the counterbores 52, they remain radially compressed. With this arrangement, the outer surfaces of the inserts 54 protrude outwardly from the plug portion 46 to assure that the inserts 54 seal against the wall of the chamber lower portion 20 around the openings 22 and 24.

Preferably, the inserts 54 are formed from an elastomeric material which is molded in the configuration illustrated in FIGS. 1, 4, and 5. The inserts 54 have an outer diameter greater than the diameter of the counterbores 52 to the extent that in order to position the inserts 54 in the counterbores 52, the outer circumferential wall of the inserts 54 must be compressed. Thus, when the inserts 54 are firmly in place in the counterbores 52, the inserts 54 are under compression and securely retained in place. To assure a secure engagement of the inserts 54 in the counterbores 52 of the plug portion 46, the inserts 54 must be radially compressed inwardly to fit in the counterbores 52. Once the inserts 54 are in place in the counterbores 52, the inserts 54 are under compression and thereby retained in secure abutting relation with the walls of the plug portion 46 around the counterbores 52. With this arrangement the inserts 54 are prevented from being displaced from the counterbores 52 when they are moved into and out of sealing relation with the valve body 14 around the openings 22 and 24 which form the valve seat 38.

As illustrated in FIGS. 1 and 5, the valve actuator portion 48 extends upwardly through the valve chamber upper portion 18 to provide an arrangement for closing the valve chamber upper portion 18. The actuator portion 48 is an integral part of the plug portion 46 and includes a flange 60 and a stem 62. The flange 60 is connected to and, thereby, forms an extension of the peripheral surface of the plug portion 46. The stem 62 is also connected to the plug portion 46 and extends centrally and upwardly from the plug portion 46.

The flange 60 is spaced circumferentially around the stem 62. The flange 60 extends upwardly between the valve body 14 and the stem 62 to a position overlying the valve body 14 to, thereby, close the chamber upper portion 18. The stem 62 projects upwardly within the flange 60 and above the valve body 14 to facilitate manipulation of the stem 62 to open and close the service valve 10.

As seen in FIG. 1, the valve member 40 is molded to provide the stem 62 with an internal core 64 surrounded by a wall having a thickness corresponding to the wall thickness of the flange 60. Most preferably, the flange 60 and stem 62 are molded to provide external radial surfaces at a point 66 where the flange 60 and the stem 62 join the plug portion 46 and at points 68 and 69 where the flange 60 overlies the valve body 14. With this arrangement, the flange 60 and stem 62 are integrally formed with a substantially uniform wall thickness throughout. This feature minimizes internal stresses attendant with the molding process that are caused by unequal "shrink" of unequal thicknesses of the plastic as it cools down. The substantially uniform wall thickness therefore increases the strength of the flange 60 and stem 62. In addition, the radial surfaces formed at the points 66, 68, and 69 provide the valve member 40 with increased structural strength to resist impact forces applied to the flange 60 and the stem 62. The radial surfaces are operable to distribute impact forces evenly to the flange 60; while, a normally sharp corner at points 66, 68 and 69 would concentrate the impact forces at the sharp corner and produce premature failure.

The valve body 14, as illustrated in FIG. 1, includes an upper shoulder 70 that extends around the chamber upper end portion 18. The upper shoulder 70 forms a circumferential bearing surface for receiving the bottom surface of the flange 60 of the actuator portion 48. This arrangement provides a relatively large flange/body contact area that is operable to absorb substantial impact loads applied to the actuator portion 48 without damaging it or the valve body 14.

By providing a substantial contact area between the flange 60 and the upper shoulder 70 of the valve body 14, when an impact force is applied to the actuator portion 48 it moves downwardly until the flange 60 abuts the shoulder 70, thereby restraining further downward movement of the plug portion 46. The impact forces are transmitted away from the stem 62 and the plug portion 46 through the valve body 14 and the couplings 34 and 36 to the piping system 12. Alternately, the impact forces may be transmitted from the valve body 14 to the valve support (not shown) installed with the service line. This arrangement provides the service valve 10 with an impact resistant structure which is capable of transmitting impact loads directed upon the top of the actuator portion 48 to an area of the valve 10 removed from the vertical center line of the valve member 40 and, in particular, away from the valve member 40 and through the valve body 14 to the conduits 30 and 32.

The ability of the service valve 10 to resist impact forces applied to the upper portion of the valve 10, and, particularly to the flange 60 and the stem 62 is enhanced by the radial surfaces that extend from the horizontal flange portion 60 downwardly to the vertical wall of the actuator portion 48. Thus, the radial surfaces of the flange 60, together with the substantial contact area provided between the flange 60 and the upper shoulder 70 of the valve body 14, permit relatively high impact loads to be applied to the valve 10 without damaging the valve body 14 or the valve member 40.

The service valve 10, including the valve body 14 and the valve member 40 and the coupling therefor, which will be described later, is fabricated of a plastic material by injection molding. Most preferably, the valve body 14, the valve member 40 and the coupling are made from a thermoplastic material known as ZYTEL ST 801 marketed by Dupont. This material is preferred because it possesses high impact resistant properties and when used to fabricate the valve of the present invention provides the valve body 14 and the valve member 40 with substantial, structural rigidity that resists creep or migration of these body parts away from each other, particularly, in the area above and below the seal inserts 54 where the valve body 14 abuts the plug portion 46.

Most preferably, the valve body 14 and the valve member 40 are molded to provide a uniform wall thickness throughout these valve parts. The wall thickness is equal for both the valve body 14 and the valve member 40. This eliminates the need for the valve body 14 to include, for example, a built-up area or a reinforcing ring that extends around the valve body 14 to resist migration or creep of the elastomeric valve body 14 away from the valve member 40.

Referring to FIG. 5, there is illustrated, in greater detail, the features of the valve member 40 and seat seal inserts 54. The valve member 40 has a lower end through which extends a counterbore 72 below the flow passage 50. Surrounding the counterbore on the outer surface of the valve member 40 is an annular groove 74 adapted to receive a snap ring 76 shown in FIG. 1. The snap ring 76 is releasably engageable in the groove 74 with an internal shoulder 78 of the valve body 14 to permit disassembly of the valve 10 without damaging any of the components of the valve 10. The valve body 14, as illustrated in FIG. 1, includes a lower annular recess 80 that surrounds the lower end of the valve member 40. The connection of the valve member 40 to the valve body 14 is sealed by a cover 82, also fabricated of a plastic material, to protect this area of the service valve 10 from tampering, as well as, to protect the internal components of the valve 10 from water and debris entering the valve chamber lower end portion 20.

The cover 82 has a cup-shaped configuration and is releasably insertable into the valve body recess 80 and engageable with the body portion wall surrounding the recess 80. The cover 82 extends to a depth in the recess 80 to abut the shoulder 78. The cover 82 is releasable from engagement with the valve body portion wall surrounding the recess to permit efficient disassembly and removal of the valve member 40 from the valve body 14 for maintenance of the valve or the like.

As illustrated in FIGS. 1, 4, and 5, the plug portion 46 of the valve member 40 includes a pair of circumferential grooves or recesses 84 positioned above and below the flow passage 50. A pair of annular seals 86 having a circular cross section are fabricated of an elastomeric material. The seals 86 are received within the annular grooves 84 and sealingly engage the inner circumferential wall of the valve body 14. The seals 86 provide an effective seal above and below the flow passage 50 to prevent leakage around the plug portion 46 and both upwardly and downwardly through the valve body 14.

As illustrated in FIG. 1, further sealing between the valve member 40 and the valve body 14 is provided by a weather seal ring 88. The seal ring 88 is fabricated of an elastomeric material positioned in surrounding relation with the actuator portion 48 underlying the flange 60 within the valve chamber upper portion 18. Preferably, the weather seal ring 88 is positioned within an enlarged diameter portion 90 of the valve body 14 below the actuator flange 60 and sealingly engages the internal circumferential wall of the valve body enlarged diameter portion 90.

Most preferably, the weather seal ring 88 is a one-way pressure seal ring having a U or V-shaped configuration directed upwardly toward the flange 60, so as to close off the chamber upper end portion 18 below the flange 60. The ring 88 is operable as a one-way pressure seal to prevent water and debris from entering the valve body 14 around the actuator portion 48 and permit the escape of excessive fluid pressure within the valve 10 upwardly and out of the valve 10 between the actuator portion 88 and the valve body 14.

Figure 2:
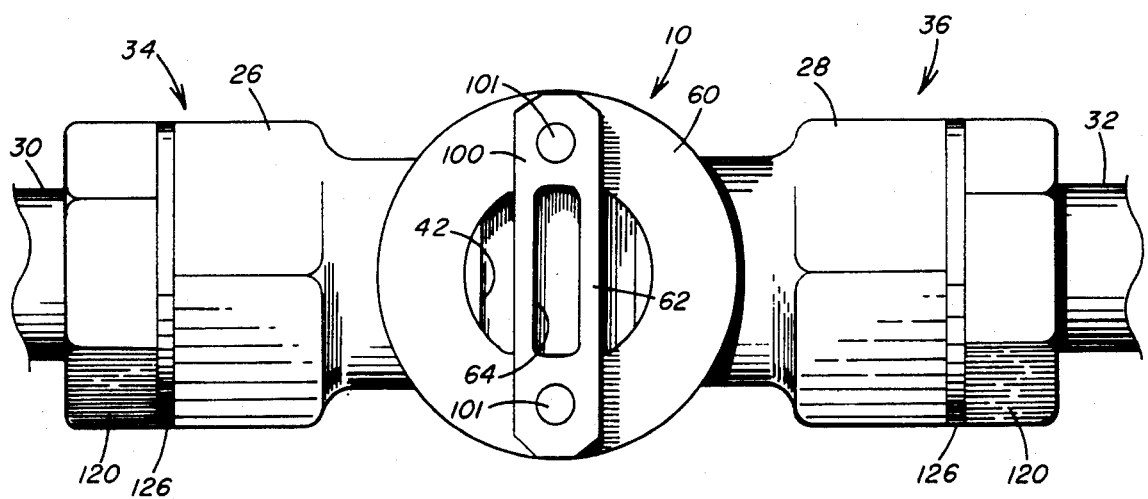
FIG. 2 is a top plan view of the plastic service valve shown in FIG. 1, illustrating an actuator of the valve in a closed position.

Now referring to FIGS. 1, 2 and 3, there is illustrated, in detail, the features of the actuator portion 48 for the valve member 40 to operate between the open and closed positions. Referring particularly to FIG. 3, there is illustrated the valve actuator portion 48 positioned for rotatable movement within the enlarged diameter portion 90 of the valve body 14. The actuator portion 48, as discussed above, is molded to provide a substantially uniform wall thickness throughout the actuator portion 48 and the stem 62 and also to provide the surfaces 42 and 44 with radial inside and outside corners. In this manner, the wall thickness of the actuator portion 48 substantially corresponds to the wall thickness of the stem 62 and, thereby, strengthens these valve member parts.

The actuator portion 48 includes an actuator stop mechanism, shown in FIG. 3, for limiting rotational movement of the valve member 40 between the open and closed positions of the valve. Preferably, the actuator stop mechanism includes a pair of tabs 92, one of which is illustrated in FIG. 5, that extend diametrically outwardly from the circumferential wall of the actuator portion 48 below the flange 60 and above the plug seal groove 84 and below the weather seal 88 within the enlarged cylindrical portion 90 of the valve body 14. Positioned in the portion 90 on the valve body 14 are a pair of stops or lands 94, shown in FIG. 3. The stops 94 project inwardly and extend a preselected circumferential distance around the actuator portion 48. The actuator stops 94 each include shoulders 96 and 98 that are engageable with the tabs 92 of the actuator portion 48. The adjacent pairs of shoulders 96 and 98 are spaced a preseltected distance apart to provide for 90° operation of the valve member 40 between the open and closed positions.

With the valve member 40 in the closed position, as illustrated in FIGS. 1 and 3, the tabs 92 abut the shoulders 98. To open the valve 10, the stem 62 is rotated in a counterclockwise direction until the tabs 92 engage the shoulders 96. In the event the stem 62 is over-torqued, the tabs 92 will break off from the actuator portion 48 to permit 360° operation of the valve member 40. With this arrangement, even though the stem 62 is over-torqued, the service valve 10 remains in operation without a failure of the pressure boundary between the valve member 40 and the valve body 14.

As a means to indicate the relative position of the valve member 40, i.e. in either the open position or the closed position, the valve stem 62 includes a wing top 100, illustrated in FIGS. 2 and 5. The above-described core 64 of the stem 62 extends upwardly through the wing top 100. In addition, in order to maintain a substantially uniform wall thickness throughout the valve elements, a pair of bores 101 extend downwardly a preselected distance in the wing top 100. The bores 101 are centered in the area between the core 64 and the opposite ends of the wing top 100. The closed ends of the bores 101 are spaced above recesses 102 to achieve the desired uniform wall thickness throughout the valve stem 62.

The wing top 100 has an elongated configuration extending in overlying relation with the flange 60. The wing top 100 is undercut, as illustrated in FIG. 5, above the flange portion 60 to form a recess 102 in the stem 62. The provision of the recess 102 weakens the wing top 100 so that in the event the stem 62 is over-torqued, the wing top 100 will snap off before more extensive damage results in the valve member 40 so that the valve member 40 remains operable. This arrangement is comparable to a mechanical fuse and prevents the valve 10 from being removed from service due to the application of excessive torque to the stem 62.

The provision of the wing top 100 also serves as a position indicator for the valve member 40. For example, when the valve member 40 is in the closed position, the wing top 100, as illustrated in FIG. 2, is positioned perpendicular to the direction of flow through the conduits 30 and 32. In the open position of the valve member 40, the wing top 100 is aligned or parallel to the direction of flow through the conduits 30 and 32. This arrangement for indicating the position of the valve member 40 is effective as long as the tabs 92 remain connected to the actuator portion 48.

Now referring to FIG. 1 and the details of the connection of the conduits 30 and 32 to the fitting portions 26 and 28 of the valve body 14, there is illustrated a pair of metallic stiffeners 104 and 106, which are positioned in the ends of the conduits 30 and 32, respectively, in underlying relation with the couplings 34 and 36. The stiffeners 104 and 106 are tubular members each having an outwardly flared end portion 108 that serves to prevent the stiffeners 104 and 106 from being inserted too far into the conduits 30 and 32. The metallic stiffeners 104 and 106 reinforce the plastic conduits 30 and 32 when compressed by the engagement of the couplings 34 and 36 on the valve body fitting portions 26 and 28.

Each of the fitting portions 26 and 28 includes a bore 110 for receiving the conduits 30 and 32. A recess 112 formed in the body of each fitting portion 26 and 28 surrounds the bore 110 to form an internal shoulder 114. An elastic deformable member, such as a Buna-N gasket 116 is positioned in the recess 112 in abutting relation with the internal shoulder 114. A washer 118, which may be fabricated from either plastic or metal, overlies the gasket 116 in the recess 112. A plastic nut 120, also fabricated of the same material sued to mold the valve body 14 and the valve member 40, is threadedly connected to each fitting portion 26 and 28. Preferably, the fittings 26 and 28 are internally threaded, and the nuts 120 are externally threaded. The nuts 120 are threadedly advanced into the respective internally threaded ends of the bores of the fittings 26 and 28.

As seen in FIG. 1, each nut 120 has a first externally threaded end portion 122 and, preferably, a hexagonal second end portion 124 separated from the threaded end portion 122 by a circumferentially extending shoulder 126. With this arrangement, the nut 120 is threadedly advanced into the fitting threaded bore until the shoulder 126 abuts the end of the respective fitting to limit the axial advancement of the nut 120 into the fitting. When the nut 120 is in this position, the nut end portion 122 directly applies a compressive force through the washer 118 upon the gasket 116 to compress the gasket 116 into sealing relation around the respective conduit and with the body of the fitting around the shoulder 114.

By limiting the advancement of the nut 120 into the fitting bore 110 by abutment of the shoulder 126 with the end of the fitting, the gasket 116 is compressed by the end of the nut and the degree of compression of the gasket 116 is controlled. In this manner, excessive compression and damage of the gasket 116 is prevented. Accordingly, the dimensional length of the nut threaded portion 122 from the shoulder 126 to the end of the nut 120 is selected to provide advancement of the nut 120 to a preselected stop point in the respective fittings 26 and 28. When the shoulder 126 abuts the end of the fitting, the end of the nut 120 is positioned at the stop point. At the stop point the nut applies a preselected compressive force upon the gasket 116 to form a positive seal around the respective conduit between the conduit and the fitting body portion.

The nut 120 is operable to directly apply a compressive force through the washer 118 upon the gasket 116. Thus, the gasket 116 is urged into sealing relation with the outer surface of the respective conduit and the inner surface of the respective fitting around the recess 112. Control of the degree of advancement of the nut into the fitting assures positive sealing engagement of the gasket 116 with the respective conduits and fittings to form an effective fluid tight seal therearound.

A further feature of the couplings 34 and 36 is the positioning of pipe-gripping collars 128 between the nuts 120 and the respective conduits 30 and 32. Each pipe-gripping collar 128 has an external wedge surface 130 complementary and cooperating with an internal wedge surface 132 of the nut 120. The collar 128 is positioned in a bore 134 of the nut 120 surrounding the respective conduit. When the nut 120 is advanced to the stop point in the respective fitting where the shoulder 126 abuts the end of the fitting, the enlarged end of the collar 128 is spaced from the washer 118 as shown in FIG. 1. Thus, it is not necessary for the collar 128 to be forced into abutting relation with the washer 118 in order to compress the gasket 116. The end of the nut 120 applies the force to compress the gasket 116 and not the collar 128.

As the nut 120 is threadedly advanced upon rotation into the threaded end of the respective fitting, the nut internal wedge surface 132 rides up the collar external wedge surface 130. This urges the collar 128 into frictional engagement with the respective conduit. The nut 120 is rotated until the shoulder 126 abuts the end of the fitting, and a preselected wedging force is applied by the nut 120 to the collar 128.

The frictional engagement of the collar 128 with the respective conduit is enhanced by the provision of an internal roughened surface, as by serrations 138, on the collar 128. Thus, the nut 120 is advanced a preselected distance into the fitting to not only effect a seal around the respective conduit by compression of the gasket 116 but also to firmly engage the collar 128 with the conduit. In this manner, the conduits 30 and 32 are sealingly connected to the valve assembly 10. A fluid tight seal is formed around the conduits 30 and 32 within the fittings and against the body of the fittings 28 and 30 within the fittings 28 and 30.

According to the provisions of the patent statutes, we have explained the principle, preferred construction and mode of operation of our invention and have illustrated and described what we now consider to represent its best embodiment. However, it should be understood, that, within the scope of the appended claims, the invention may be practiced otherwise than as specifically illustrated and described.

We claim:

1. A plastic pipe coupling comprising, a fitting having a plastic body portion with a bore for receiving a plastic pipe, said fitting terminating in an end portion and said fitting bore including an internally threaded portion, said fitting body portion having a recess adjacent said bore internally threaded portion to form an internal shoulder within said fitting, an elastic deformable member positioned in said recess in surrounding relation with the plastic pipe, a plastic nut having a plastic body portion with an internal bore including an internal wedge surface, said nut body portion having an externally threaded portion engageable with said fitting bore internally threaded portion and terminating in an end portion to form a shoulder extending radially outwardly on said nut body portion, said elastic deformable member including an annular gasket having one side abutting said fitting internal shoulder and an opposite side positioned to receive an axially directed force, said gasket being compressed axially between said fitting body portion internal shoulder on said one side and said nut end portion on said opposite side upon advancement of said nut into said fitting bore, said gasket being compressed on the pipe to effect a fluid tight seal around the pipe, a plastic pipe-gripping collar having an external wedge surface complementary to and cooperating with said nut internal wedge surface so that said collar is positioned within said nut internal bore and surrounding the plastic pipe, said collar having an internal wall with a roughened surface for frictionally gripping the plastic pipe, said collar external wedge surface being formed by an enlarged end portion and a reduced end portion, said nut surrounding said collar and said nut end portion extending beyond the end of said collar in said fitting bore, said nut end portion having a bearing surface for applying a compressive force which is transmitted to said gasket opposite side to compress said gasket one side against said fitting internal shoulder, said nut being threadedly advanced upon rotation to a stop point in said fitting bore where said nut body portion shoulder abuts said fitting end portion limiting the compression of said gasket to form a controlled seal around the pipe within said fitting, said nut extending into said fitting bore to said stop point where said nut body portion shoulder abuts said fitting end portion to externally indicate the position of said nut in said fitting to obtain a preselected degree of compression of said gasket by said nut where the degree of compression of the gasket is limited by the abutment of said nut body portion shoulder with said fitting end portion thereby preventing excessive compression of said gasket, said collar roughened surface being urged into frictional engagement with the pipe upon rotation of said nut to retain the pipe within said fitting, and said collar enlarged end portion being removed from compressive relation with said elastic deformable member when said nut is advanced to said stop point such that compressive forces are applied to said elastic deformable member only by said nut end portion.

2. A pipe coupling as set forth in claim 1 which includes,
   a washer positioned within said fitting bore between said elastic deformable member and said collar,
   said nut end portion bearing surface abutting said washer above said collar, and
   said nut end portion bearing surface being compressed against said washer to apply a uniform axial force through said washer upon said elastic deformable member.

3. A pipe coupling as set forth in claim 2 in which,
   said nut and said collar are fabricated of a plastic material, and
   said washer being fabricated of a metallic material.

4. A pipe coupling as set forth in claim 1 which includes,
   a stiffener positioned in underlying relation with said fitting, nut, and collar within the pipe to reinforce the pipe in said fitting.

* * * * *